March 19, 1968  J. WATERMANN  3,373,767
FLOW CONTROL VALVE FOR REGULATING FLUID FLOW RATES
Filed June 24, 1965  2 Sheets-Sheet 1

Inventor:
JÜRGEN WATERMANN
By
Owen, Wickersham Erickson
Attorneys $$Y = \frac{d}{2} \sin \frac{\pi}{2 \cdot x_{max}} \cdot X$$

Non-linear spring characteristic of diaphragm

United States Patent Office 3,373,767
Patented Mar. 19, 1968

3,373,767
FLOW CONTROL VALVE FOR REGULATING
FLUID FLOW RATES
Jürgen Watermann, Baustrasse 17,
Solingen-Ohligs, Germany
Filed June 24, 1965, Ser. No. 466,707
Claims priority, application Germany, June 27, 1964,
W 37,060
8 Claims. (Cl. 137—503)

ABSTRACT OF THE DISCLOSURE

The flow-rate regulator provides a restrictor between a stationary wall portion and a throttling member moved by the flowing medium, the restrictor reducing its cross section of flow in response to an increase in the pressure differential between the inlet and the outlet of the flowing medium, so as to maintain a constant rate of flow. The regulator is characterized by a stationary outer cylindrical rim and a flexible diaphragm mounted by the rim; one side of the diaphragm is exposed to the inlet pressure, and the other side is exposed to the outlet pressure, the stationary wall portion being on the outlet side opposite the diaphragm. The diaphragm has a round central aperture with its edge facing the stationary wall portion to provide a circumferential gap in communication with the outlet, and a spindle mounted movably in the central aperture is provided with means for adjusting its location from outside, in order to vary the circumference of the gap. The portion of the spindle penetrating through the diaphragm forms a hollow cylinder whose sheath is cut out to provide shaped openings for passage of the fluid medium into the gap, and the hollow spindle is closed off by transverse walls at both ends. The delineations of the cutouts are such that a change in the circumferential length of the gap occurs in linear proportion to the longitudinal movement of the spindle.

This invention relates to a flow control valve for regulating fluid flow rates.

The valve of this invention can be used in hydraulic and pneumatic systems to deliver fluid at various flow rates, which are adjustable to different values, each of which is independent of the pressures in the system and is also independent of the temperature of the fluid.

Such a device may be used as an infinitely adjustable speed control for motors or cylinders that are to be operated at a constant speed despite load variations and changes in the fluid's temperature. It may also be used for accurately metering one fluid into another, as in fuel injection, for example.

The new valve of this invention employs a single, pressure-and-temperature-compensated, variable orifice. The configuration of the orifice provides a linear relationship between a change in the valve's setting and the resulting change in the discharge rate of the fluid. Extremely small discharge rates can be achieved without danger of plugging the orifice even if there are dirt particles within the fluid.

The invention provides a flow-rate regulator in which a restrictor is formed between a stationary wall portion and a member which is moved by the flowing medium. The restrictor's cross-sectional area of flow decreases as the pressure differential between the inlet side and the outlet side increases in order to maintain a constant rate of flow.

In a known flow-rate regulator of this general type, the movable member comprises a ball supported on a spring of nonlinear characteristic and disposed in a conical constriction of the flow cross-section of the regulator. This prior-art known regulator has the disadvantage that the initial height of the gap at the restrictor changes when adjustment is made for a different rate of flow, thus impairing the precision of the controlling movements of the restrictor under the influence of the changing pressure differentials.

In another known flow rate regulator, the movable member is a sharp-edged plate which is movable in the throttle aperture in an axial direction against the action of a spring. Though the walls of the aperture surrounding the plate may be adapted with mathematical precision to the flow conditions to be taken into account, it is impossible in this type of prior-art regulator to alter the basic rate of flow without altering the height of the throttle clearance.

One object of the present invention is to provide a flow-rate regulator for hydraulic and pneumatic systems which can dispense adjustable quantities of fluid (liquid or gas), with any set flow rate remaining unchanged even if there are changes in pressure conditions in the system or in the temperature of the flowing medium.

Another object of the invention is to provide a single restrictor that takes care of all factors influencing constancy of the flow rate, compensating for changes in those factors without changing the flow rate, and yet enabling purposeful changes in the flow rate from one constant rate to another.

In this invention, the throttle member comprises a flexible diaphragm, one side of which is exposed to the inlet pressure and the other side to the outlet pressure of the controlled fluid. The stationary wall portion is disposed on the outlet side, opposite the part of the diaphragm which is deflected due to the pressure differential. This apparatus maintains the rate of flow at a constant value even during very rapid successive fluctuations of pressure in the system, since the throttle member itself has an extraordinarily small inertia.

An advantageous embodiment of the invention may have the diaphragm attached along its circumference and provided with a round central aperture whose edge is disposed opposite the fixed wall portion, leaving a gap extending in circumferential direction and connected to the outlet. To prevent changes in the rate of flow, which does not alter linearly with the pressure differential acting on the diaphragm, the diaphragm may rest against an abutment on the outlet side, whose surface is such that rigidity of the membrane is increased as its deflection increases.

In accordance with another advantageous feature, the rate of flow (which, once set, is then to be maintained constant with the aid of the regulating member) is adjusted by varying circumferentially the length of the gap between the diaphragm and the stationary wall portion by means of a spindle which is axially movable in the central orifice of the diaphragm and which can be serviced from the outside. This means that the width of the orifice always remains the same, even when the rates of flow differ, and that the flow cross-section formed by the orifice is altered by change in the longitudinal extent of the orifice. As a result, the regulator does not become clogged by dirt particles present in the operating medium, even when adjustment is made for very low rates of flow.

In accordance with a further proposal of the invention, a simple expedient for adjusting the rate of flow is provided: the section of the spindle which penetrates the diaphragm forms a hollow cylinder with cutouts in the cylinder sheath.

To compensate the cylindrical spindle against longitudinal thrust which may be caused by pressure of the flow medium, the spindle is preferably closed at both ends by transverse walls.

For easier adjustment, the boundaries of the cutouts provided in the sheath of the cylindrical spindle are such that change of the length of the orifice in the circumferential direction is proportional to the longitudinal movement of the spindle.

The invention is described hereinbelow in greater detail in connection with an embodiment illustrated in the drawings.

Figure 1:
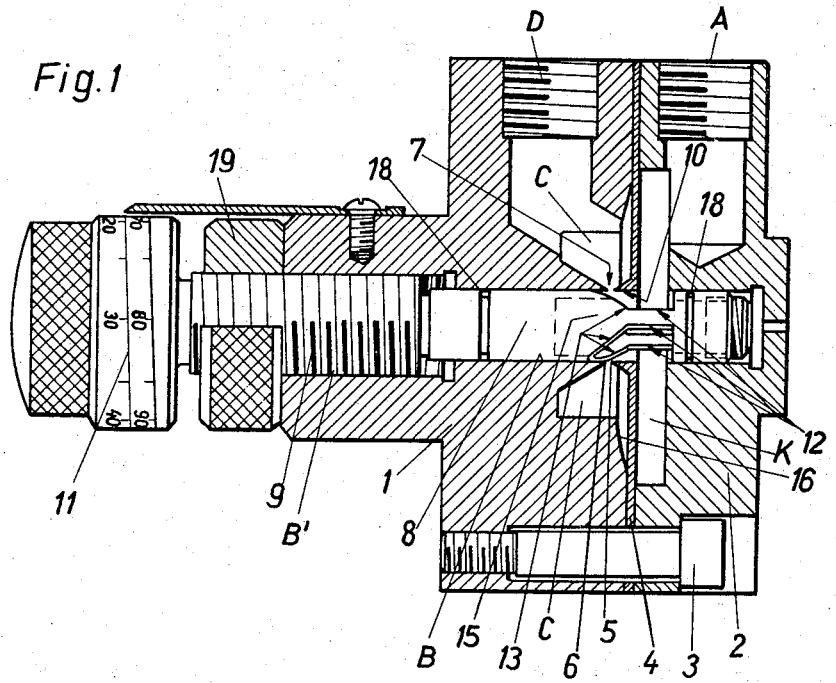
FIG. 1 is a view in elevation and partly in section of a flow rate regulator embodying the principles of the invention.

The housing of the regulator illustrated in FIG. 1 includes a body portion 1 and a cover portion 2 which are interconnected by screws 3. In the body portion 1 as well as in the cover 2, a continuous bore B is connected to an annular chamber K, which in turn is in communication with an inlet passage A.

In the front surface of the body portion 1 of the housing, facing the cover 2, a further annular chamber C is provided surrounding the central bore B, the chamber C being in communication with an outlet passage D. The wall of the body 1 which separates the bore B from the chamber C terminates in an annular edge 6 facing the cover 2.

A diaphragm 4, which may be of steel, is inserted between the two housing portions 1 and 2 and has a central aperture 10, whose diameter corresponds to that of the bore B. The aperture 10 of the diaphragm 4 is surrounded by an annular raised bead 5 whose terminal edge faces the edge 6, being separated therefrom by a gap or orifice 7.

In the region surrounding its central orifice 10, one side of the diaphragm 4 is exposed to the inlet pressure prevailing in the chamber K on the diaphragm's inlet side, while the other side of the diaphragm 4 is exposed to the pressure prevailing in the chamber C, on its outlet side. A surface 16 of the body portion 1 of the housing, against which the diaphragm 4 abuts, leads in a curved path away from the surface of the diaphragm. The purpose of this configuration 16 will be explained further below.

A spindle 8 is longitudinally displaceable in the bore B of the housing and in the central opening 10 of the diaphragm 4, its purpose being to adjust the rate of flow desired at any given time. The forward section of the spindle 8 (the portion extending to the right in FIG. 1) is a hollow cylinder, its circumferential wall being cut away such that a configurated nose portion 12 is formed, delineated by edges 13 which are located in the region of the gap 7 that is formed transversely to the longitudinal axis of the spindle 8 between the diaphragm 4 and the wall 6. Hence, the gap 7 is screened circumferentially by the nose 12 for a distance which varies when the spindle 8 is moved. The fluid to be regulated, flowing from the inlet A through the chamber K to the gap 7, can thus flow only through that part of the gap 7 which is not covered by a cylindrical part 15 of the spindle 8 which borders on the edges 13.

Figure 2:
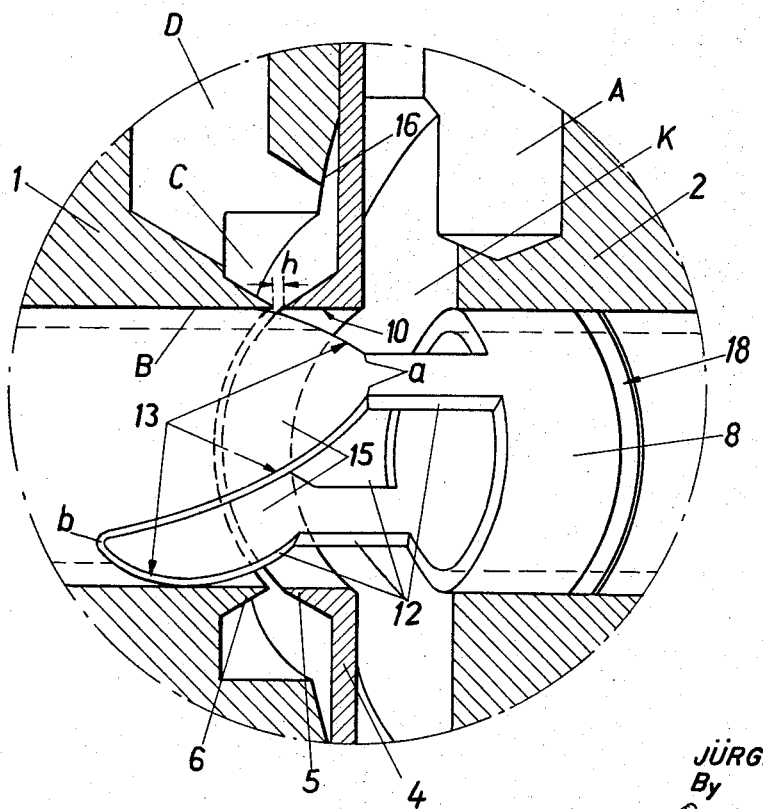
FIG. 2 is an enlarged fragmentary view in perspective and partly in section of a portion of the spindle and adjacent parts.

The above-described conditions are clearly shown in FIG. 2, a perspective view of a part of the spindle 8.

The nose 12 provides two cylindrical portions 15, which, in the illustrated example, are interconnected by two parallel segments 12a and 12b. While the front surface 13a of the cylindrical portion of the spindle 8 shown on the right in FIG. 2 lies in a plane perpendicularly intersecting the longitudinal axis of the spindle 8, the nose portion 12 is delineated by the curved edges 13. The edges 13, whose beginning at the connecting segments 12a and 12b is designated a and whose apex within their curved trajectory is designated b, leave two sections of the gap 7 uncovered by the adjacent sheath portions 15, the circumferential length of these uncovered sections being greater or lesser depending on the axial adjustment of the spindle 8.

The spindle 8 may be sealed against the bores B and 10 by means of suitable packing 18 on both sides of the diaphragm 4 (FIG. 1). For axial displacement of the spindle 8, a thread 9 on its outer end projects into a bore extension B' in the housing body 1, the bore B' being provided with a matching interior thread. A locknut 19 secures the spindle 8 in position after adjustment of the desired flow rate. The outside end of the spindle 8 is equipped with a rotary head 11 bearing markings for indication of the adjusted rate of flow.

The fluid entering the chamber K from the inlet A flows through the interior of the cylindrical section of the spindle 8, and thence passes at the nose 12 via the areas which are clear of the spindle sheath portions 15, through the gap 7 into the chamber C on the outlet side, whence it is discharged through the outlet D. The pressure of the medium in the chamber K acts on the diaphragm 4 to reduce the width $h$ of the gap 7, while pressure of the fluid which has already traversed the gap 7 acts in the chamber C against reduction in the width $h$ of the gap 7. Thus, in dependence on the pressure differential prevailing between the chambers K and C, a specific gap width $h$ obtains between the edgelike bead 5 on the diaphragm and the edge 6 of the separating wall of the body 1.

The flow rate Q at the throttle gap is given by the following equation:

$$Q = F \cdot Cd \cdot \sqrt{\frac{2 \cdot g}{\gamma}} \cdot \sqrt{P_I - P_{II}}$$

(Equation I)

wherein:

$Q$=cm.³/sec. is the rate of flow
$Cd$ is the dimensionless flow coefficient
$g$=cm./sec.² is the acceleration due to gravity
$\gamma$=kg./cm.³ is the specific weight of the fluid
$P_I$=kg./cm.² is the pressure upstream of the throttle gap 7 in the fluid chamber K
$P_{II}$=kg./cm.² is the pressure downstream of the throttle gap 7 in the fluid chamber C
$F$=cm.² is the flow cross-section of the throttle gap or orifice 7.

The flow cross-section of the throttle gap 7 is the result of $$F = d \cdot \pi \cdot h \cdot \lambda$$

wherein:

$d \cdot \pi$ is the circumference of the spindle 8, which is also that of the bore 10,
$h$ is the width of the gap 7 formed by the axial clearance between the edges 5 and 6,
$\lambda$ is the dimensionless part of the circumferential length $d \cdot \pi$ of the gap 7 which is left exposed by the cylindrical portions 15 of the spindle 8.

The term $\gamma$ may be considered as being constant, since the change of the specific weight of the fluid in dependence on pressure and temperature is very insignificant and may therefore be disregarded for all practical purposes.

Equation 1 can be re-expressed as $$Q = K \cdot h \cdot \lambda \cdot Cd \cdot \sqrt{\Delta p} \quad \text{(Equation I}a\text{)}$$

in which $$K \text{ is a constant} = d \cdot \pi \cdot \sqrt{\frac{2 \cdot g}{\gamma}}$$

since the diameter $d$ of the spindle 8 or of the bore 10 remains constant, the pressure gradient $P_I - P_{II}$ between the sides of the throttle gap, being designated herein by $\Delta \rho$.

Consequently, the desired rate of flow may be regulated by altering $\lambda$, while pressure is compensated automatically by change in the width $h$ of the throttle gap 7. Compensation of temperature influences may be achieved by thermal-expansion correction of $\lambda$.

Adjustment of a specific rate of flow occurs by axial displacement of the spindle 8 by means of the hand knob 11, that is, the value $\lambda$ is altered, $\lambda = 0$ corresponding to complete screening of the gap 7, and $\lambda = 1$ corresponding to the least possible screening of the gap 7, so that the largest possible rate of flow is obtained which is possible with a regulator of a specific size.

Increase or reduction of the flow rate over the entire regulated range becomes linearly proportional to the adjustment of the rate-regulating screw 8, in that the curved edges 13 of the nose 12 assume a shape which corresponds to the equation $$Y = \frac{d}{2} \cdot \sin\left(\frac{\pi}{2 \cdot x_{max.}} \cdot x\right)$$

Figure 3:
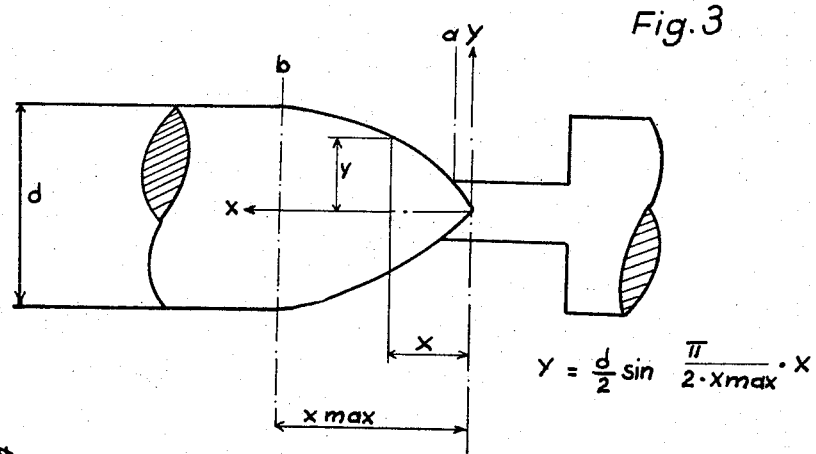
FIG. 3 is a diagrammatic fragmentary view in elevation of the regulating spindle showing some of the critical relationships in dimensions.

The coordinates of this equation are shown in FIG. 3. This particular configuration of the edges 13 is recommended in order to achieve identical changes of the flow cross-section of the gap 7 by identical regulating movements of the spindle 8.

Automatic compensation of the effect of pressure changes on the flow rate is caused by change of the width $h$ of the throttle gap as a result of deflection of the diaphragm 4 in dependence on the pressure gradient $P_I - P_{II} = \Delta \rho$.

Because of the hydraulic resistance of the gap 7, a pressure gradient $\Delta \rho$ obtains during flow through the gap 7, the pressure $P_I$ on the inlet side in the chamber K is always greater than the pressure $P_{II}$ in the chamber C, the latter being determined by the consumption of the user. The pressures $P_I$ and $P_{II}$ acting on the two surfaces of the diaphragm 4 generate a force which deflects the diaphragm 4 in the direction of the greater pressure and thereby reduces the width $h$ of the orifice.

When the width $h$ of the orifice 7 in dependence on the pressure gradient $P_I - P_{II}$ is varied so that $$h = \frac{M}{(P_I - P_{II})^{0.5}}$$

the rate of flow through the orifice 7 is $$Q = Cd \cdot K \cdot \frac{M}{\sqrt{P_I - P_{II}}} \cdot \lambda \cdot \sqrt{P_I - P_{II}} = Cd \cdot K \cdot M \cdot \lambda$$

(Equation Ib)

$M$ being a constant depending on the resilient properties of the diaphragm. When the condition $$h = h_0 - f = \frac{M}{P_I - P_{II}}$$

is fulfilled, the flow rate is that given in the Equation Ib, entirely independent of the pressure conditions in the system.

In the above, $h_0$ is the width of the orifice when the pressure gradient is $\Delta \rho = 0$; $f$ designates the deflection of the diaphragm 4.

This condition is fulfilled when the deflection $f$ of the diaphragm 4 follows the expression $$f = h_0 = \frac{M}{P_I - P_{II}}$$

requiring increased rigidity as the deflection $f$ of the diaphragm 4 increases. Increasing rigidity of the diaphragm 4 as a function of the deflection is achieved by the arcuate abutment 16 in the lower part 1 which is shaped so that, the more the diaphragm is deflected the larger the area of the diaphragm's surface that comes to rest against the abutment 16.

Temperature compensation of the regulator is required to a very insignificant extent only, since the sharpness of the edges 5 and 6 participating in the throttling of the flow medium as well as the rate-adjusting edges 13 insure great independence from the temperature-influenced viscosity of the fluid. The sharpness of the throttle edges reduces changes of the rate of flow caused by the temperature-sensitive laminar border layer of the fluid stream to a minimum.

The remaining inaccuracy in the rate of flow may be compensated with thermal expansion by the choice of the materials of which the spindle 8 and the part 1 are made. If the material of the spindle 8 has a higher coefficient of thermal expansion than the material of the part 1, the spindle 8 (and thereby the cylindrical portions 15) expand farther in axial direction than the portion 1 when the temperature rises, so that the gap 7 is screened slightly more than is the case when the adjustment is otherwise the same but the temperature of the fluid is lower.

This increased screening of the flow cross-section of the gap 7 caused by the heat expansion of the spindle in axial direction cancels the increase of the flow rate caused by a higher temperature of the fluid.

The flow coefficient $Cd$ is an experimentally established value which depends on the geometrical character and size of the throttle gap, since variable geometric character and size of the throttle gap variably influence the contract of the fluid jet in the gap. The annular throttle gap 7 through which the fluid flows in radial direction retains its geometry, since regulation of the rate of flow merely alters the circumferential length in circumferential direction. Thus the coefficient of flow does not undergo any change when the adjustment of the rate of flow is changed.

However, change of the width $h$ of the gap brings about a change of the coefficient of flow $Cd$. When the change of the coefficient of flow $Cd$ as a function of the width $h$ of the gap has been determined, the inaccuracy in the rate of flow caused by the coefficient of flow may be eliminated by using the deflection of the diaphragm 4 not merely for pressure-flow rate compensation, but also for compensating the variable coefficient of flow $Cd$.

For example, the experimentally determined interdependence between the flow coefficient $Cd$ and the width $h$ of the gap is superposed on the pressure compensation equation $$h = h_0 - \frac{M}{\sqrt{\Delta \rho}}$$

Figure 4:
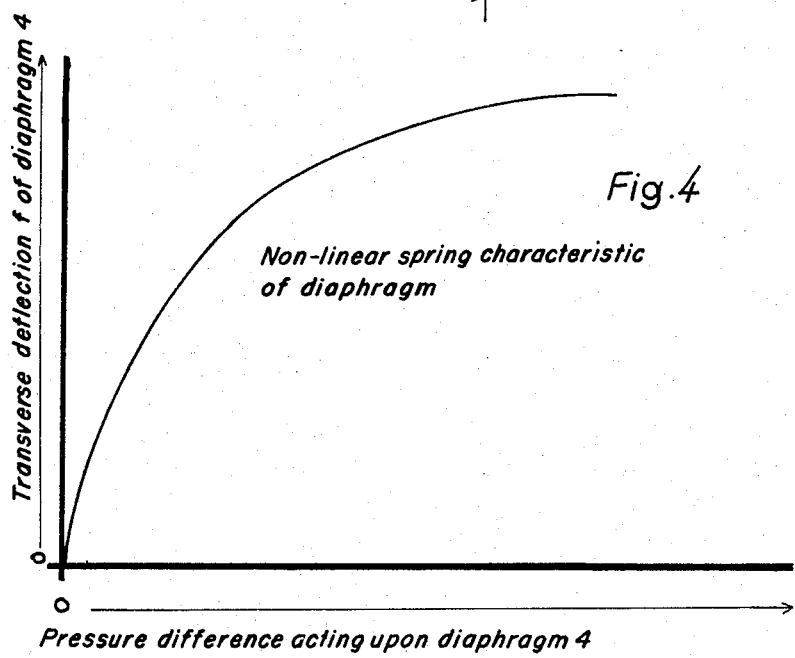
FIG. 4 is a graph of a nonlinear curve of a typical spring characteristic of a diaphragm suitable for use in this invention.

That means that the pressure compensation is intentionally "erroneous," to take into account the change of the flow coefficient as a function of such pressure compensation, so as to achieve by this combined compensation a flow rate which is independent of pressure and of the flow coefficient. This requires change of the nonlinear spring characteristic of the diaphragm 4, shown in FIG. 4, in accordance with the change of the flow coefficient.

Flow of fluid in direction opposite to the regulated direction, with a minimum pressure drop, is made possible in that in this case the pressure $P_{II}$ in the chamber C is greater than the pressure $P_I$ in the chamber K, and the diaphragm 4 is deflected in direction of the highest pressure $P_{II}$, thereby increasing the width $h$ of the gap. Since the diaphragm 4 is considerably less rigid in this direction because there is no progressive support for the diaphragm, the deflection and thus also the orifice $h$ become correspondingly larger.

When regulating the rate of flow of gases, a difference is merely in the somewhat variable nonlinear spring characteristic of the diaphragm 4 which is required for purposes of pressure compensation. The width $h$ of the gap of the gas regulator must follow the term $$h = h_0 - f = Mg \cdot \left[ P_I \left( \frac{P_{II}}{P_I} \right)^{\frac{1}{K}} \cdot \sqrt{\left( \frac{P_{II}}{P_I} \right)^{\frac{K-1}{K}}} \right]$$

up to the value $$\frac{P_{II}}{P_I} > 0.528$$

and then, for values $$\frac{P_{II}}{P_I} < 0.528$$

follow only the pressure $P_I$ because the expression $$\left( \frac{P_{II}}{P_I} \right)^{\frac{1}{K}} \cdot \sqrt{\frac{P_{II}}{P_I}^{\frac{K-1}{K}}}$$

approaches the value "1." Up to the value $$\frac{P_{II}}{P_I} > 0.528$$

the spring characteristic of the diaphragm is nonlinear. It is only starting from the value $$\frac{P_{II}}{P_I} < 0.528$$

that the spring characteristic becomes linear.

This precondition for faultless pressure compensation by the principle applied in this invention results from the generally known equation:

$$W = Cd \cdot C \cdot F \cdot \frac{P_I}{\sqrt{T}} \left( \frac{P_{II}}{P_I} \right)^{\frac{1}{K}} \cdot 1 - \left( \frac{P_{II}}{P_I} \right)^{\frac{K-1}{K}}$$

wherein $F = d \cdot \pi \cdot \lambda \cdot h$ is obtained the same as for fluid regulators. $P_I$ and $P_{II}$ are the pressures acting on both sides of the diaphragm 4.

T is the temperature of the gas in the chamber K,
C is a constant for the gas in question,
K is a further constant for the gas, and
W in kg./sec. gives the flow rates,
Mg is a constant determined by the resilient characteristics of the diaphragm.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a flow-rate regulator of the type providing a restrictor between a stationary wall portion and throttling means moved by the flowing medium, said restrictor reducing its cross-sectional area of flow in response to an increase in the pressure differential between a fluid inlet for said medium and a fluid outlet for said medium as to maintain the constant flow, the combination therewith wherein said throttling means comprises
   a flexible diaphragm having a stationary mounted portion and a deflectable portion, one side of which is exposed to the fluid inlet pressure and the other side of which is exposed to the fluid outlet pressure, said stationary wall portion being disposed on said outlet side opposite said deflectable portion of said diaphragm, said diaphragm being provided with a round central aperture and having a sharp-ended annular axial projection surrounding the central aperture and projecting toward said stationary wall portion to provide a circumferential gap in communication with said fluid outlet, said stationary wall portion having a sharp annular edge facing said annular projection, a spindle mounted displaceably in the central aperture of the diaphragm and having a portion penetrating through the diaphragm and providing a hollow cylinder closed off by transverse walls at both ends and partially covering said gap, with a sheath, said sheath being cut out to provide shaped openings enabling passage of the fluid medium into said gap, and
   means for adjusting the location of said spindle from outside said regulator.

2. The combination of claim 1 wherein the sheath is cut out to provide an edge whose shape is given by the equation $$y = \frac{d}{2} \sin \frac{x}{2 \, x_{max}}$$

where:

$y$ is the distance of any point on the curve from the axis of the spindle,
$x$ is the axial distance of that point from the extreme end of the cut-out edge,
$d$ is the diameter of the sheath, and
$x_{max}$ is the maximum axial length of the cut-out.

3. The combination of claim 1 wherein a support for the diaphragm is provided on its outlet side, said support providing an abutment surface contact with which increases as said diaphragm is flexed, said surface being so shaped that the rigidity of the diaphragm increases in proportion to its increasing deflection.

4. A flow-rate regulator of the type providing a restrictor between a stationary wall portion and a throttling member moved by the flowing medium, said restrictor reducing its cross section of flow in response to an increase in the pressure differential between a fluid inlet for said medium and a fluid outlet for said medium as to maintain a constant rate of flow, said regulator being characterized by said throttling member comprising an outer circumferential rim which is stationary relative to said stationary wall portion and a flexible diaphragm mounted by said rim and having a deflectable portion, one side of which is exposed to the fluid inlet pressure and the other to the fluid outlet pressure, said stationary wall portion being disposed on said outlet side opposite said deflectable portion of said diaphragm, said diaphragm being provided with a round central aperture with its edge facing said stationary wall portion to provide a circumferential gap in communication with said fluid outlet, said edge comprising a sharp-ended annular axial projection surrounding the central aperture and projecting toward the stationary wall portion, said stationary wall portion having a sharp annular edge facing the annular projection of the diaphragm.

5. A flow-rate regulator of the type providing a restrictor between a stationary wall portion and a throttling member moved by the flowing medium, said restrictor reducing its cross section of flow in response to an increase in the pressure differential between a fluid inlet for said medium and a fluid outlet for said medium as to maintain a constant rate of flow, said regulator being characterized by an outer circumferential rim which is stationary relative to said stationary wall portion and said throttling member comprising a flexible diaphragm mounted by said rim and having a deflectable portion, one side of which is exposed to the fluid inlet pressure and the other to the fluid outlet pressure, said stationary wall portion being disposed on said outlet side opposite said deflectable portion of said diaphragm, said diaphragm being provided with a round central aperture with its edge facing said stationary wall portion to provide a circumferential gap in communication with said fluid outlet, a spindle mounted displaceably in the central aperture of the diaphragm and means for adjusting the location of said spindle from the outside of said regulator for varying the circumferential length of the gap between the diaphragm and the stationary wall portion.

6. The regulator of claim 5 wherein the portion of the spindle penetrating through the diaphragm forms a hollow cylinder whose sheath is cut out to provide shaped openings for passage of the fluid medium into said gap.

7. The regulator of claim 6 wherein the hollow cylindrical spindle is closed off by transverse walls at both ends.

8. The regulator of claim 6 wherein the delineations of the cutouts in the sheath of the hollow cylindrical spindle are such that change in the circumferential length of the gap occurs in linear proportion to the longitudinal movement of the spindle.

References Cited

UNITED STATES PATENTS

| 213,118 | 3/1879 | Locke | 137—496 |
| 1,838,343 | 12/1931 | Widell | 137—503 |

FOREIGN PATENTS

| 166,606 | 8/1950 | Austria. |
| 1,038,356 | 12/1955 | Germany. |

M. CARY NELSON, *Primary Examiner.*

R. J. MILLER, *Assistant Examiner.*